United States Patent [19]

Culpepper

[11] Patent Number: 4,703,330

[45] Date of Patent: Oct. 27, 1987

[54] COLOR INK JET DROP GENERATOR USING A SOLID ACOUSTIC CAVITY

[75] Inventor: Mark A. Culpepper, Santa Clara County, Calif.

[73] Assignees: Ricoh Co., Ltd., Tokyo, Japan; Ricoh Systems, Inc., San Jose, Calif.

[21] Appl. No.: 859,480

[22] Filed: May 5, 1986

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,245,227 | 1/1981 | Krause | 346/75 |
| 4,331,964 | 5/1982 | Van Lokeren | 346/75 |
| 4,380,018 | 4/1983 | Andoh et al. | 346/140 R |
| 4,544,930 | 10/1985 | Paranjpe | 346/75 |

*Primary Examiner*—E. A. Goldberg
*Assistant Examiner*—Gerald E. Preston
*Attorney, Agent, or Firm*—Flehr, Hohbach, Test, Albritton & Herbert

[57] ABSTRACT

The drop projection device has an array of nozzles communicating with an ink cavity fed from an associated pressurized ink reservoir and has an acoustic cavity closely associated with the ink cavity. The acoustic cavity is filled with a solid material, and may be separated from the ink cavity by a membrane that may be selected of any ink compatible material for transmitting disturbances from the solid material to the ink channel (the membrane is not required, however). A transducer is mounted to the rear of the solid filled cavity, essentially in air.

The transducer is a block of piezoelectric material separated into a plurality of parallel fingers by slices made from one side of the block. The height-to-width or height-to-thickness ratios are less than 10:4. The solid acoustic cavity is filled with a material having an acoustic impedance which is substantially equal to the ink acoustic impedance. The cavity itself is defined by a material having a high acoustic impedance. The narrow, shallow ink channel across the face of the acoustic cavity is less than 2 sq. mm. in cross-section to easily expel air bubbles which form during start/stop of the ink streams. The height of the ink channel is less than 0.1 of an acoustic wavelength in ink so that the channel does not act as a separate acoustic cavity with its own standing wave pattern.

20 Claims, 5 Drawing Figures

COLOR INK JET DROP GENERATOR USING A SOLID ACOUSTIC CAVITY

CROSS REFERENCE TO RELATED APPLICATIONS

This application is related to the material disclosed in application Ser. No. 794,729, filed on Nov. 4, 1985, entitled "Inkjet Drop Generator" and application Ser. No. 794,730 filed Nov. 4, 1985, entitled "Stimulator for Inkjet Printer," both of which are incorporated herein by reference.

FIELD OF THE INVENTION

This invention relates generally to fluid drop generators and more particularly to the generation of a matrix of uniform fluid droplets from a linear array of fluid jets for use in printing apparatus such as inkjet printing devices and the like.

BACKGROUND OF THE INVENTION

Historically, printing has been done by applying ink to a specially configured key or carrier and mechanically impacting the key or carrier on a recording medium such as paper to form an impression of the carrier. More recently, non-impact printing devices have been developed, where intelligent patterns (alphanumeric characters, common graphics and the like) are deposited on a recording medium. Non-impact printing devices utilize a variety of methods of forming the intelligence patterns including chemically active and chemically inert processes, using either fluids or solids as the marking or printing medium, and requiring either specially treated recording media or untreated recording media.

It has been known to print by depositing discrete droplets of printing fluid on a recording medium in a predetermined pattern. Previous attempts to achieve such a method of printing utilize a continuous stream of fluid which separates into droplets which are charged and electrostatically deflected so that they form the desired pattern on the recording medium. Such methods produce acceptable resolution typically only when the charge per unit mass is accurately controlled for each drop. This can be accomplished in two ways: the droplets are either given equal charge per unit mass and then deflected by an electrostatic field whose intensity is controlled by the input signal, or the droplets are given a charge per unit mass according to the input signal and then deflected using a constant electrostatic field. Existing embodiments of both of these methods require that the fluid droplets be substantially uniform which has proven difficult to achieve. Once the stream of uniform droplets has been attained, it is usually necessary to provide voltages in the range of 2,000 to 10,000 volts for the electrostatic field. Such voltages are difficult and expensive to produce and control. Also, the process of charging the droplets themselves sometimes causes electrolysis of the printing fluid, creating corrosive bi-products which may cause electrode deterioration.

In an effort to obtain droplets of uniform size, different methods have been applied in the prior art. First, the printing fluid is delivered to a nozzle at sufficient pressure to assure that a continuous jet of fluid is issued from the nozzle. The jet stream is separated into droplets by using radial oscillations of vibration induced in the nozzle itself by means of magnetic drivers or piezoelectric crystals. Vibrations cause regularly spaced varicosities in the ink stream, aiding the natural tendency of the stream to separate into droplets and making the ensuing droplets more uniform than would otherwise occur. Such devices typically provide for having a plurality of ink streams issuing from a row or rows of nozzles and require a support means for the nozzles which contains the ink channel and a resonant acoustic cavity such as shown in U.S. Pat. No. 3,373,437. The material must be rigid in order to hold the nozzles fixed for accurate printing and implies a metallic material which implies it has a high acoustic impedance. For such a device to be effective, the resonant acoustic cavity within the support means must typically include the ink channel itself to be excited by either plates or pistons which in turn are excited by a piezoelectric transducer.

Another approach to droplet formation utilizes printing fluid delivered to the nozzle under sufficient pressure to form a meniscus at the nozzle not high enough to produce flow through the nozzle. In this method, the fluid is drawn from the nozzle electrostatically in a ray-like jet which is then deflected electrostatically as desired. The electrostatic field which draws the jet of fluid from the nozzle is constant, producing a continual stream of printing fluid. The stream breaks into a succession of droplets with essentially uniform mass and charge. A time varying electrostatic field controlled by the input signal is then used to deflect the droplets as required for the formation of alphanumeric characters. The foregoing printing processes and mechanisms make use of a continuous flow of printing fluid, with the flow to be diverted to a reject basing or collector whenever no characters are patterns are to be printed. This may result in a more complicated system for hindering the flow of printing fluid than would otherwise be desired.

In another type of device which is shown in U.S. Pat. No. 4,331,964, a piezoelectric transducer is employed to create acoustic waves in a solid rubber cavity.

In the type of device such as shown in the U.S. Pat. No. 4,331,964, it is effectively a dual cavity system in which the ink channel is one cavity which in turn receives acoustical energy from another rubber filled cavity which is cylindrical, and is excited by a cylindrical piezoelectric. A membrane is specified between the two cavities.

Ink or rubber has lower acoustic impedance than the support that forms the cavity (for water-based ink vs. steel, the ratio is about 1/25). As a result, an acoustical standing wave is set up in this cavity by the transducer which vibrates typically at a frequency in the range of 50–150 KHz. In order for the breakup of jet streams to be uniform, the standing wave pattern must be uniform along the jet array.

A further critical element of the design system is the piezoelectric transducer which is used to produce uniform vibrations into the acoustical cavity. If the vibrations are not uniform, the acoustical standing wave pattern will most likely also not be uniform. For example, U.S. Pat. No. 2,716,708 is a device for launching ultrasonic waves. Grooves are cut into the piezoelectric material to form a linear array of elements. The elements vibrate in antiphase. Therefore, this device does not function properly for use as an inkjet even if the elements vibrated in phase due to the excessive relative width of the array. Another patent showing a transducer is U.S. Pat. No. 4,550,606. This patent shows an ultrasonic transducer array with controlled excitation pattern. Similar disclosures are found in U.S. Pat. Nos. 4,095,232 and 4,138,687. However, in all these cases, the application is directed to generating ultrasonic compressional waves in materials (human tissue) with scattering centers for the purpose of imaging the scattering centers from their echoes. Such a device as shown in the figures of the patents would not function in an inkjet device. The piezoelectrics shown therein would not generate the necessary amplitude signals with uniformity of amplitude of vibration because the device is designed to generate vibrations several wavelengths away from itself. Near the device, uniformity of the vibration would not be adequate for an inkjet printer.

OBJECTS AND SUMMARY OF THE INVENTION

It is a general objective of the present invention to provide an improved printing method and apparatus for recording with writing fluids, and an improved drop projection means for use with such apparatus.

It is another objective of this invention to provide a drop projection means which projects droplets having a measured and reliable volume and mass for each droplet from a nozzle towards the printing medium in response to electrical signals.

Yet another objective of this invention is to provide an improved method and apparatus for recording alphanumerical and graphic intelligence patterns on a recording medium by means of deposition of droplets of printing fluid on the recording medium in an economical and reliable manner.

It is a further objective of this invention to provide a drop projecting means which projects drops from a nozzle responsive to electrical signals and in which the volume of the drops is controlled by the applied electrical signals.

A further objective of this invention is to provide a printing apparatus of the inkjet type which is simple in construction, reliable in operation, capable of printing characters at high speed with low power consumption and having a minimal cost and weight.

The foregoing and other objectives of this invention are achieved by a drop projection device in which an array of nozzles communicates with an ink cavity fed from an associated pressurized ink reservoir and having an acoustic cavity closely associated with the ink cavity. The acoustic cavity is filled with a solid material, and may be separated from the ink cavity by a membrane that may be selected of any ink compatible material for transmitting disturbances from the solid material to the ink channel (the membrane is not required, however). A transducer is mounted to the rear of the solid filled cavity, essentially in air.

The transducer comprises a block of piezoelectric material separated into a plurality of parallel fingers by slices made from one side of the block. Preferably, the height-to-width or height-to-thickness ratios are less than 10:4. This form requires a limited number of manufacturing steps, thereby reducing manufacturing costs. It provides for transducer motion which is more uniform than for known prior art shapes. Further, the operating frequency can be close to the piezoelectric resonant frequency and still maintain the required uniformity of motion across the entire face of the transducer. As a result, the piezoelectric drive voltage will be less, which will reduce the cost of the piezoelectric drive circuitry. Testing shows that the variation in amplitude and phase of motion across the piezoelectric base is less than 10%, thereby providing a drop generator which will operate properly over a wide range of environmental temperatures and ink viscosities.

The preferred embodiment of the present invention further includes a solid acoustic cavity filled with a material having an acoustic impedance which is substantially equal to the ink acoustic impedance. The cavity itself is defined by a material having a high acoustic impedance. Fewer and less costly parts will be required to form this acoustic material filled cavity. It would not be obvious to a person of skill in the art based on the prior art known to the inventor that acoustic waves of sufficient amplitude and uniformity could be generated with this type of arrangement, utilizing the combination of a solid acoustic cavity with a piezoelectric attached to the rear of the cavity and extending into air space defined by the framework of the inkjet generator.

Further, the preferred form of the present invention includes a narrow, shallow ink channel across the face of the acoustic cavity. Preferably, the ink channel is less than 2 sq. mm. in cross-section to easily expel air bubbles which form during start/stop of the ink streams. Air bubbles can be expelled from larger channels, but a large cross-flow of fluid would be needed to force loose the bubbles; this would require larger pumps or pressure accumulators, or control valves and circuitry, larger ink inlet and outlet ports into the channel, and attendant higher costs. The inkjet printer is then much less compact. The larger ports would effectively increase the size of the resonant cavity and thus, change the uniformity of the standard wave pattern. In this circumstances, the required input energy from the piezoelectric transducer is increased.

The height of the ink channel in the preferred embodiment is less than 0.1 of an acoustic wavelenth in ink so that the channel does not act as a separate acoustic cavity with its own standing wave pattern. Theoretical analysis of the device for selection of the cavity dimensions to optimize uniformity of the standing wave pattern can be more easily accomplished than for a large ink cavity; therefore, the development costs for the inkjet printer of the present invention will be less.

The use of a smaller ink cavity has other advantages. As unprinted ink recirculates in this type of inkjet printer, its more volatile components evaporate and it becomes more viscous. As a result, its sound speed changes. Changes in environment temperature can also alter ink sound speed if ink temperature is not controlled. Ink sound speed influences the standing wave pattern in the acoustic cavity filled with ink. Since for the present invention, the ink channel is small enough so that it does not support standing waves within itself, the effects of changes in ink sound speed are minimized. As a result, ink temperature and viscosity do not have to be maintained within as limited a range as with a large cavity. As a result, the cost and complexity of the claimed inkjet printer are less, and cold startup time is reduced.

The objectives and advantages of the present invention will be more clearly understood from the following detailed description of the invention, wherein

DETAILED DESCRIPTION OF A PREFERRED EMBODIMENT

Figure 1:
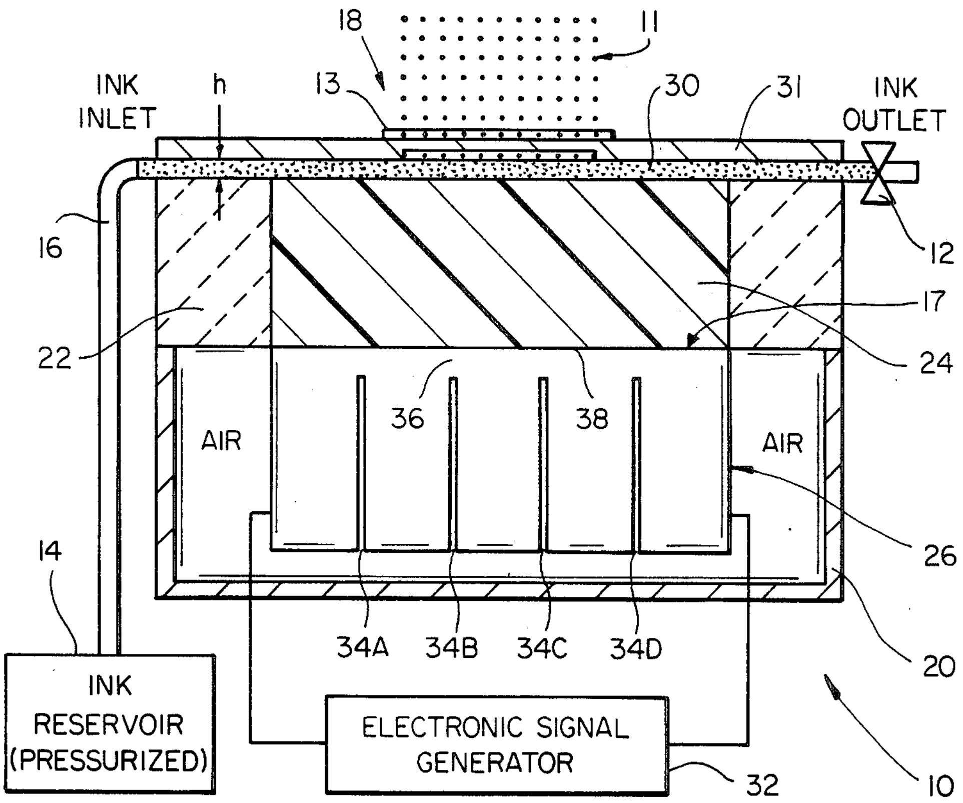
FIG. 1 is a cross-sectional view of the elements of an inkjet drop generator as used in this invention and especially showing the relationship of the nozzle plate, the acoustic cavity and piezoelectric transducer of the present invention.

The apparatus 10 shown in FIG. 1 includes a pressurized ink reservoir 14 which may be any suitable reservoir for the particular printing fluid used. The ink source 14 feeds through a tube 16 into the jet projecting device on the printhead 18. A valve 12 allows purging of air from the printhead during initial filling with ink. Ink streams 11 flow out of the nozzle plate 13.

Turning to details of the inkjet apparatus, it includes a support frame 20 supporting a material 22 which defines an acoustic cavity 24. The material of 24 is chosen to have an acoustic impedance approximately equal to the ink acoustic impedance so that sound waves generated to transducer 26 may be conveyed easily through the material to the ink channel itself. The acoustic cavity 24 has a size and shape important to the transmission of uniform standing wave patterns from the piezoelectric material to the ink channel 30 which is defined in channel face plate 31. In the present invention, a simple rectangular shape is preferred to be used for the cavity 24. Testing has demonstrated that by utilizing a rectangular cross-sectional acoustical cavity 24 in combination with the transducer as defined and a small ink channel, that acoustic standing waves of sufficient amplitude and uniformity can be transmitted from the piezoelectric transducer 26 to the ink in the channel 30.

Figure 2:
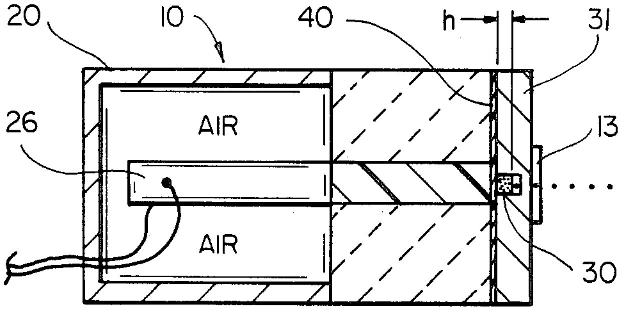
FIG. 2 is a schematic view of the device shown in FIG. 1 rotated 90° to show the mechanical relationship of the elements of this invention.

The piezoelectric transducer 26 itself, which is energized by the electronic signal generator 32 has a comb-like shape. That is, a solid block of piezoelectric material may be formed into the transducer 26 of this invention by cutting narrow slits 34*a*, 34*b*, 34*c*, 34*d*, into the transducer material, all from the same side. A length of backing material 36 is left inplace to enable the transducer to hold its shape. This backing material is bonded to the solid acoustic material at the junction 38. The ink channel plate 31 is provided, bonded across the forward opening of the acoustic cavity 24, and receives the acoustic disturbances which are generated by the piezoelectric transducer. The height h of the ink channel 30 (shown in FIG. 2) is less than 0.1 of an acoustical wavelength in ink, so that the channel does not act like a separate acoustic cavity with its own standing wave pattern. This minimizes the effect of changes in ink sound speed with changes in the thickness, temperature and viscosity of the ink. A slot 33 allows the ink to reach nozzle plate 13 to be ejected toward the paper 12. The reasons and advantages of this are discussed above in the summary of the invention.

It should be noted that the material 22 used to define the acoustic cavity 24 may be of steel, ceramic or any other material with a high acoustic impedance. The solid material 22 which fills the cavity 24 may be of rubber, plastic, epoxy or any other material which has an acoustic impedance approximately equal to that of the ink. This material may be either molded into the cavity or bonded to the inner surface of the cavity with a suitable bonding material.

In an alternative and highly useful embodiment of this invention, a thin membrane 40 may be placed across the surface of the second opening; that is, the opening of the acoustic cavity 24. In contrast to prior work in this field where selection of material for the membrane was significant, the membrane of the present invention may be made of rubber, polyethylene or a thin sheet of any other material which is chemically compatible with the ink. The membrane need not be used at all if the material used to fill the acoustic cavity 24 is itself ink compatible.

This would be provided by the use of solid acoustic materials in the rectangular cavity 24 such as plastic, epoxy resin, or an epoxy resin mixed with tiny glass hollow spheres.

The piezoelectric transducer 26 is made of standard piezoelectric crystal material. Its advantages reside in all the cuts being made from a single side of the device, and using very thin cuts to form the slices 34*a–d*. Finite element analysis has shown that this shape is a significant improvement over those used in the prior art in generating waves which are uniform over the full surface of the transducer, and which may be uniformly transmitted from this surface 38 to the ink channel. The stimulator itself is a piezoelectric plate cut with a diamond saw to form the channels 34*a–d* into the comb-like shape. This shape, as stated above, vibrates uniformly in the x direction when excited by a signal generator 32 near its first resonant frequency for the x direction. When coupled to an acoustic ink cavity as shown herein, the vibration of the piezoelectric 26 generates uniform pressure fluxuations in the ink channel which in turn cause uniform breakoff of the inkjets.

Figure 3:
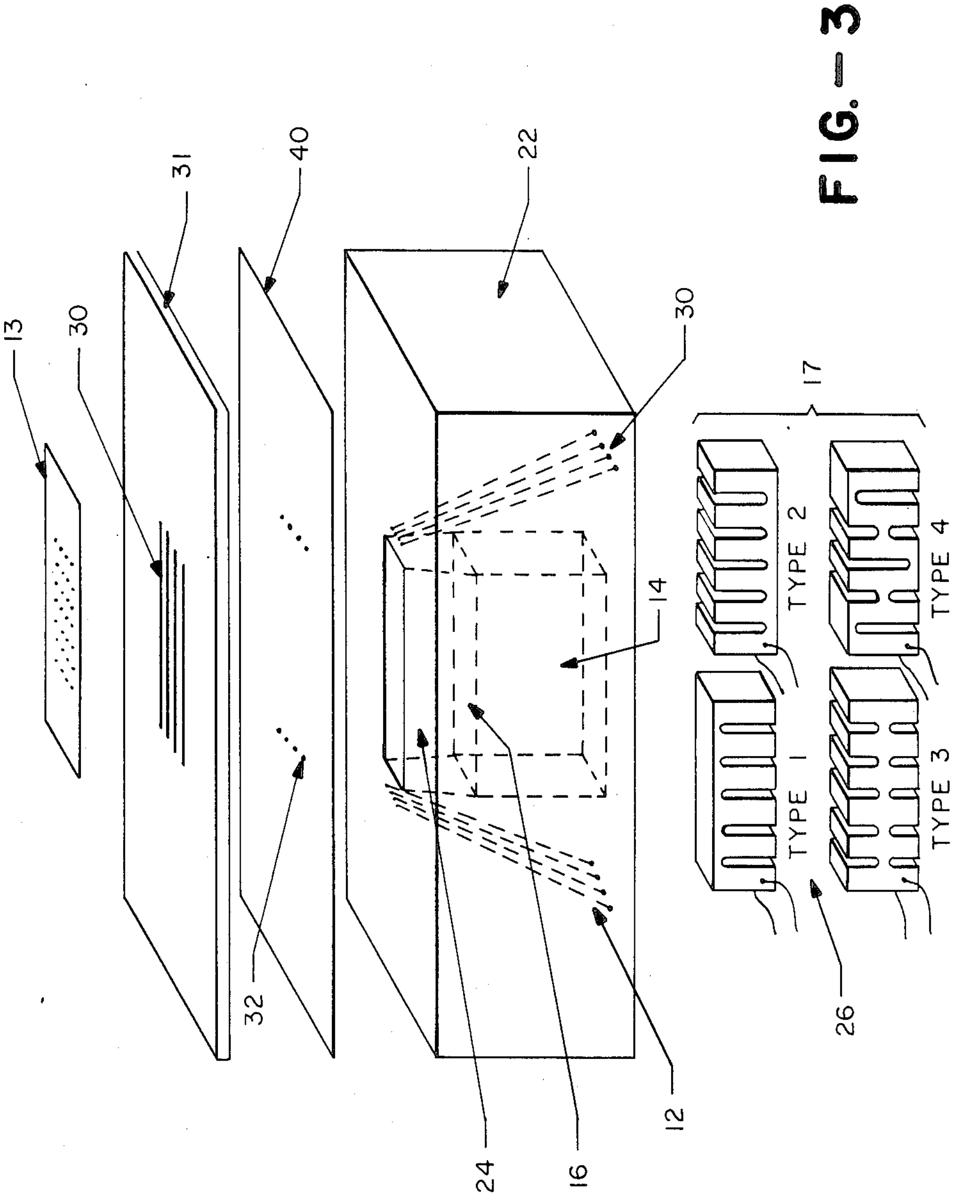
FIG. 3 is an exploded view of the elements of an acoustically driven drop generator.
Figure 4:
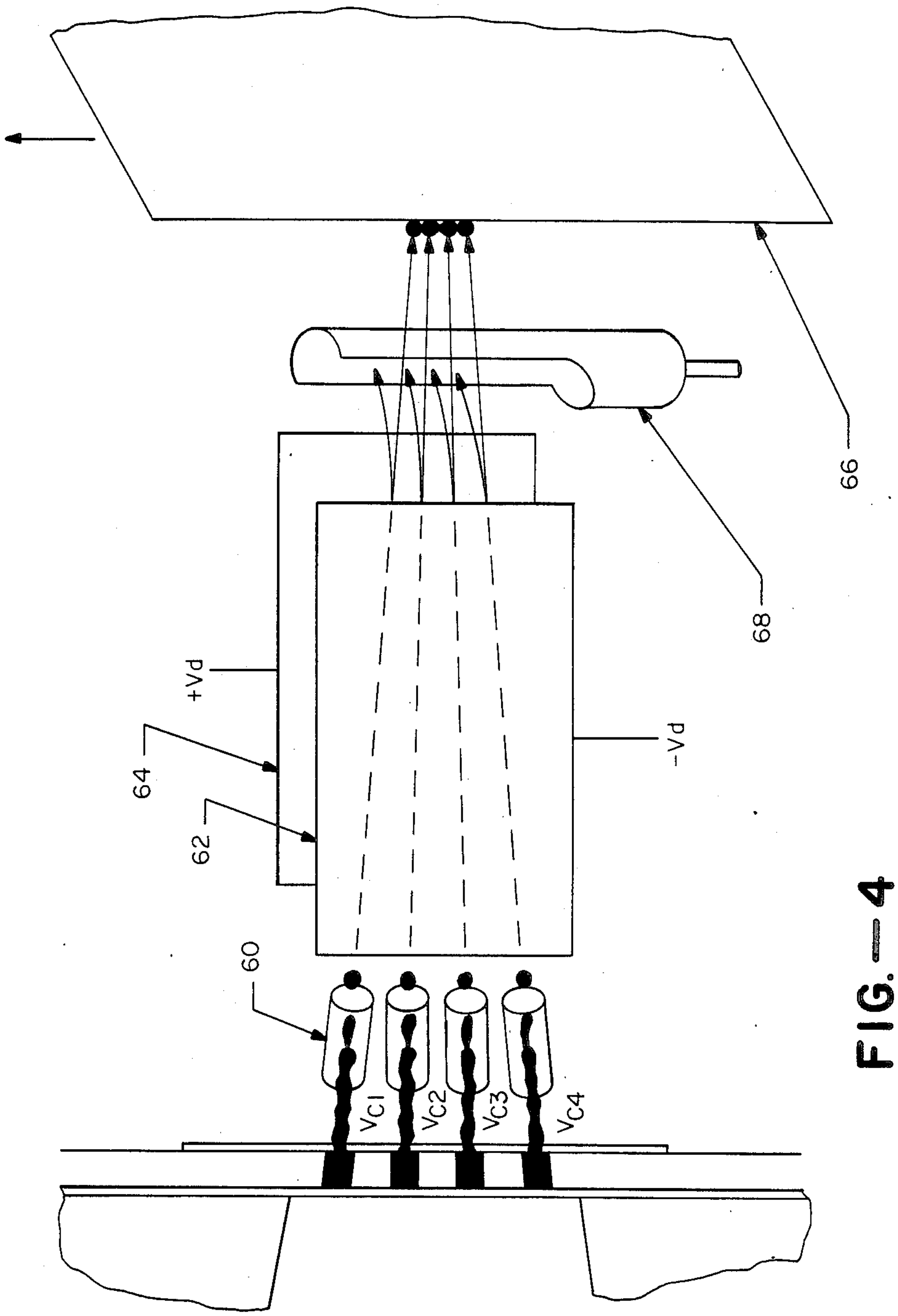
FIG. 4 is a side view of the drop generator of the present invention showing the means for deflecting the charged droplets.
Figure 5:
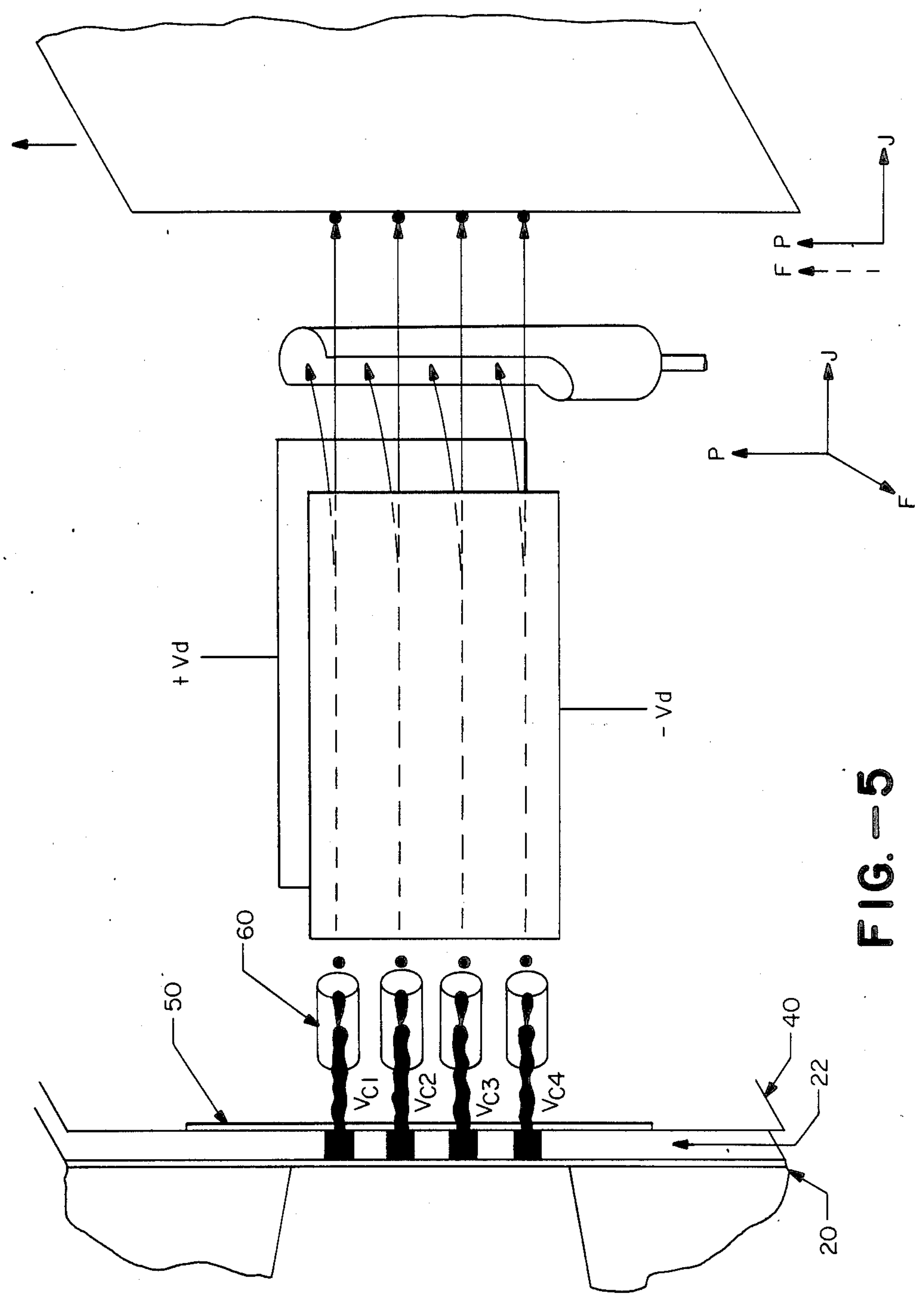
FIG. 5 is a vertical sectional view of an alternative embodiment of the invention shown in FIG. 1 wherein the axes of the ink cavity converge to substantially the same spot on the recording medium.

FIG. 3 shows a disassembled or exploded perspective view of a two-cavity, acoustically driven ink drop generator developed in accordance with an alternative embodiment of this invention to provide a plurality of ink cavities driven by the acoustic transducer 26 of this invention. A more detailed view of the relative orientation of the paths followed by the ink drops after being expelled through the orifice plate past the deflection electronics is shown in FIGS. 4 and 5.

In a preferred embodiment shown in FIG. 3, the cavity is tapered from the surface 17 at which the solid acoustic material is coupled to the acoustic source 24 toward the surface which is covered by the membrane 40 that acoustically couples the acoustic cavity 24 with the ink cavities 30 of ink cavity plate 31. The tapering is to concentrate, smooth and propagate through the metallic membrane 40 to a uniform pulsating effect as created by the acoustic source 26 through the apex of the cavity 24 into the relatively smaller ink cavity slots 30 of ink cavity plate 31. In this way, uniform breakoff of the ink drops at the relatively high frequency of operation is achieved.

Ink is supplied through ink inlets 30 which communicate through opening 32 in the impervious membrane 20 to the ends of the ink cavity slots 22. Ink flow-through outlets 12 are provided attached to the far ends of the ink cavity slots 30 so that an ink flow through the full length of the slot without bubbles or other disturbances in the ink flow can be achieved. As the ink flows through the slots 30, the pulsating output of the acoustic sources as concentrated through the solid filled cavity 24 is coupled through the plastic or metallic membrane 31 to the slots 30. As can be seen, the multiple ink cavity slots 30 disposed external to the acoustic cavity 24 and the membrane 31 are all in simultaneous acoustic communication with the single acoustic cavity. In this way, simultaneous generation of the drops from the slots through the orifice plate 13 is achieved, even at the relatively high frequency (about 110 KHz) of operation of the system. The use of multiple parallel slots also allows for simultaneous use of different colored inks. Several types of piezoelectric transducers, as in FIG. 3, may be used. The transducer is essentially in block form with slots 42 cut substantially across the depth of the block transducer. These slots have been found to reduce the bulk motion of the block, and enchance the piston-like motion of the transducer toward and away from the membrane 20 and cavity slots 22 to produce the desired pulsating effect on the ink filaments emanating from the orifices of plate 40. A low cost assembly of the entire system is achieved by using this structure inasmuch as the piezoelectric transducer can be bonded or molded into the transducer cavity 14 in alignment with the solid filled acoustic cavity, after the acoustic cavity has been appropriately filled with the desired low density propagating material. In fact, it is possible to eliminate the transmissive membrane entirely if the material of the acoustic cavity is made chemically compatible with the ink.

It should also be noted that the ink cavity slots 30 are relatively short, or about 1/16 of an acoustic wave length at high frequency operation. This improves the uniformity of the standing wave created at the outlet nozzles or orifices to promote uniformity of generation of the ink drops from slots 30 through the orifice plate 13. It can also be seen from FIGS. 4 and 5 that the present arrangement readily lends itself to charging of the drops after passage of the drops through the orifice plate 13 by appropriately formed electrodes 60 aligned with each opening in the orifice plate. After appropriate charging of the generated drops, the drops pass between plates 62, 64 which provide appropriate deflection of each drop either to reach the recording medium 66 or the collecting gutter 68. A slight modification of the ink cavity and the placement of the charging electrodes 60 allows for converging of the outputs of the multiple ink cavities at about the same spots on the recording media as shown in FIG. 3. In this way high speed, or high density, or multi-color printing can be easily and reliably achieved.

Other embodiments may occur to a person of skill in the art who studies the invention disclosure. Therefore, the scope of this invention is to be limited only by the following claims.

What is claimed is:

1. A drop generator for multi-collor printing for breaking up an ink stream synchronously into outwardly propelled droplets in order that the droplets may be charged and deflected for the purpose of printing, comprising

- a support frame defining a resonance cavity with first and second openings on the front and rear of the cavity, respectively,
- a solid material for filling the cavity comprising means for transmitting acoustical disturbances from the rear to the front opening of the cavity,
- a disturbance means mounted within said frame external to the cavity at the second, rear opening to said cavity, said disturbance means being bonded to the solid material filling the cavity,
- an ink channel plate positioned within the frame across the face of the front opening of the cavity defining a plurality of ink channels across the front opening of said cavity for simultaneously dispensing a plurality of droplets in response to energization of said acoustic means,
- a nozzle plate attached to the ink channel plate defining a plurality of rows of nozzles having one end open to said channel and the other end open to expel said outwardly propelled droplets, one of each of said rows being supplied by one of said channels, and
- a means for supplying ink of different colors to each of said channels, said different colored inks being expelled through said nozzles in response to disturbances created by said disturbance means and transmitted by said solid material to said ink channel to expel said ink, whereby multi-color printing of high quality may be achieved.

2. A drop generator as in claim 1 wherein said solid material is a low density material.

3. A drop generator as in claim 2 wherein said low density material is selected from a group comprising plastic and epoxy resin and epoxy resin mixed with tiny glass spheres.

4. A drop generator as in claim 1 wherein said support means is formed of a material with a high acoustic impedance.

5. A drop generator as in claim 1 wherein the solid material filling the cavity has an acoustic impedance approximately equal to that of the ink.

6. A drop generator as in claim 5 wherein said solid material is selected from the group consisting of rubber, plastic and epoxy.

7. A drop generator as in claim 5 including means for bonding said acoustic solid material into said cavity.

8. A drop generator as in claim 5 wherein said solid material is molded into said cavity.

9. A drop generator as in claim 1 wherein said disturbance means comprises a comb-shaped member of piezoelectric material, said comb member comprising finger portions extending in parallel and joined by a spine portion, said spine portion being bonded to said solid material.

10. A drop generator as in claim 9 wherein said fingers are separated by thin, parallel saw-thickness slits.

11. A drop generator as in claim 1 wherein said channel has a height of less than 0.1 of an acoustical wavelength in the ink used in said drop generator, said channel thereby transferring the disturbance from the acoustical cavity directly to the ink stream.

12. A drop generator as in claim 1 or 11 wherein the cross-section of the ink channel is so limited as to expel air bubbles formed in the ink.

13. A drop generator as in claim 12 wherein the cross-section of said ink channel is less than 2 sq. mm.

14. A drop generator as in claim 1 including a membrane formed of an ink compatible material placed across the front opening of said cavity for transmitting disturbances from said solid material through said front opening to said ink channel.

15. A drop generator as in claim 14 wherein the cross-section of the ink channel is so limited as to expel air bubbles formed in the ink.

16. A drop generator as in claim 14 wherein the cross-section of said ink channel is less than 2 sq. mm.

17. A drop generator as in claim 1 wherein said plate defines a plurality of ink channels across the front opening of said cavity for simultaneously dispensing a plurality of droplets in response to energization of said acoustic means.

18. A drop generator as in claim 17 in which the axes of the multiple ink cavities are parallel to each other.

19. A drop generator as in claim 17 in which the axes of the multiple ink cavities converge to substantially the same spot on the recording medium.

20. A drop generator as in claim 18 further comprising means for charging the ink drops generated through each orifice plate in response to disturbances by said acoustic source further comprising means for deflecting said charged ink drop to the recording medium in which one or multiple gutters are used to collect unrecorded charged drops.

* * * * *

UNITED STATES PATENT AND TRADEMARK OFFICE

Certificate

Patent No.: 4,703,330 Patented: Oct. 27, 1987

On petition requesting issuance of a certificate of correction of inventorship pursuant to 35 USC 256, it has been found that the above-identified patent, through error and without any deceptive intent, improperly sets forth the inventorship. Accordingly, it is hereby certified that the correct inventorship of this patent is:
Mark A. Culpepper and Marco Padalino.

Signed and Sealed this Seventeenth Day of April, 1990

BRUCE A. REYONLDS

*Supervisory Patent Examiner*
*Art Unit 216*